Aug. 30, 1966  W. SHULVER ETAL  3,269,883
METHOD FOR PRODUCING ELECTRICALLY-CONDUCTIVE ELEMENTS
Filed Feb. 10, 1961  2 Sheets-Sheet 1
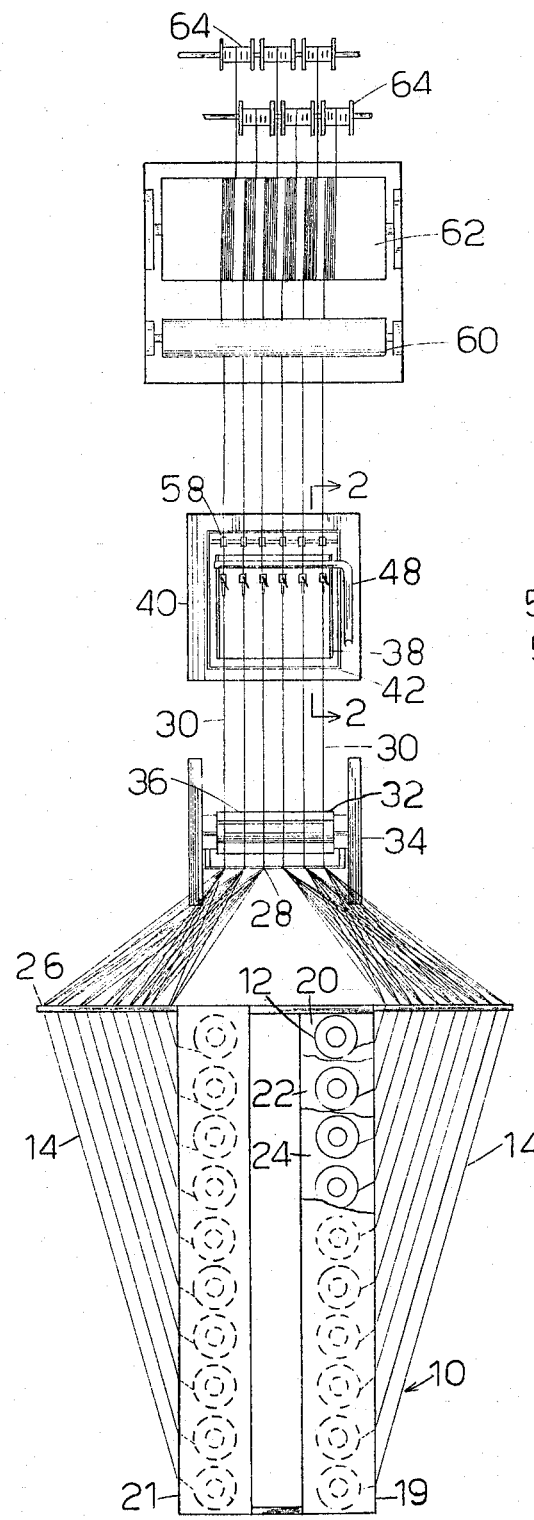
FIG. 1
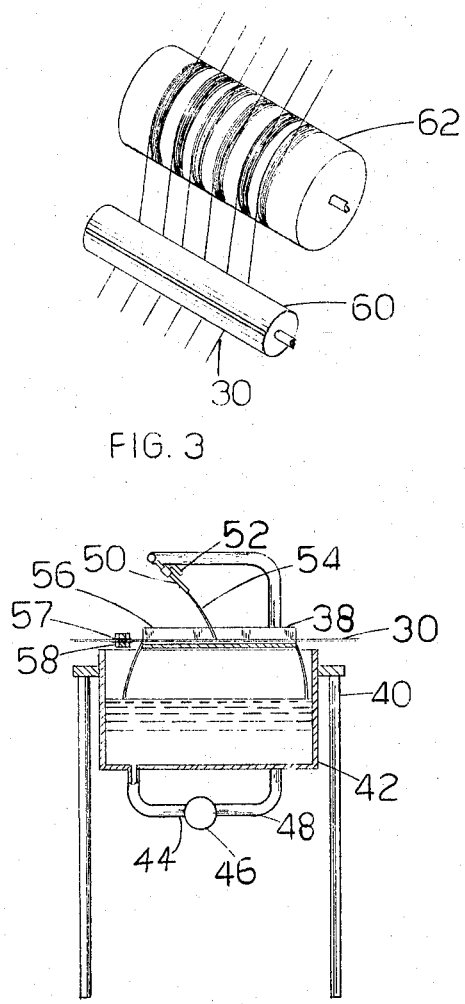
FIG. 3
FIG. 2
*INVENTOR.*
WILLIAM SHULVER  WILLIAM H. MILLER
THOMAS L. ATTERIDGE  ALFRED MARZOCCHI
BY
*Staelin & Overman*
ATTORNEYS

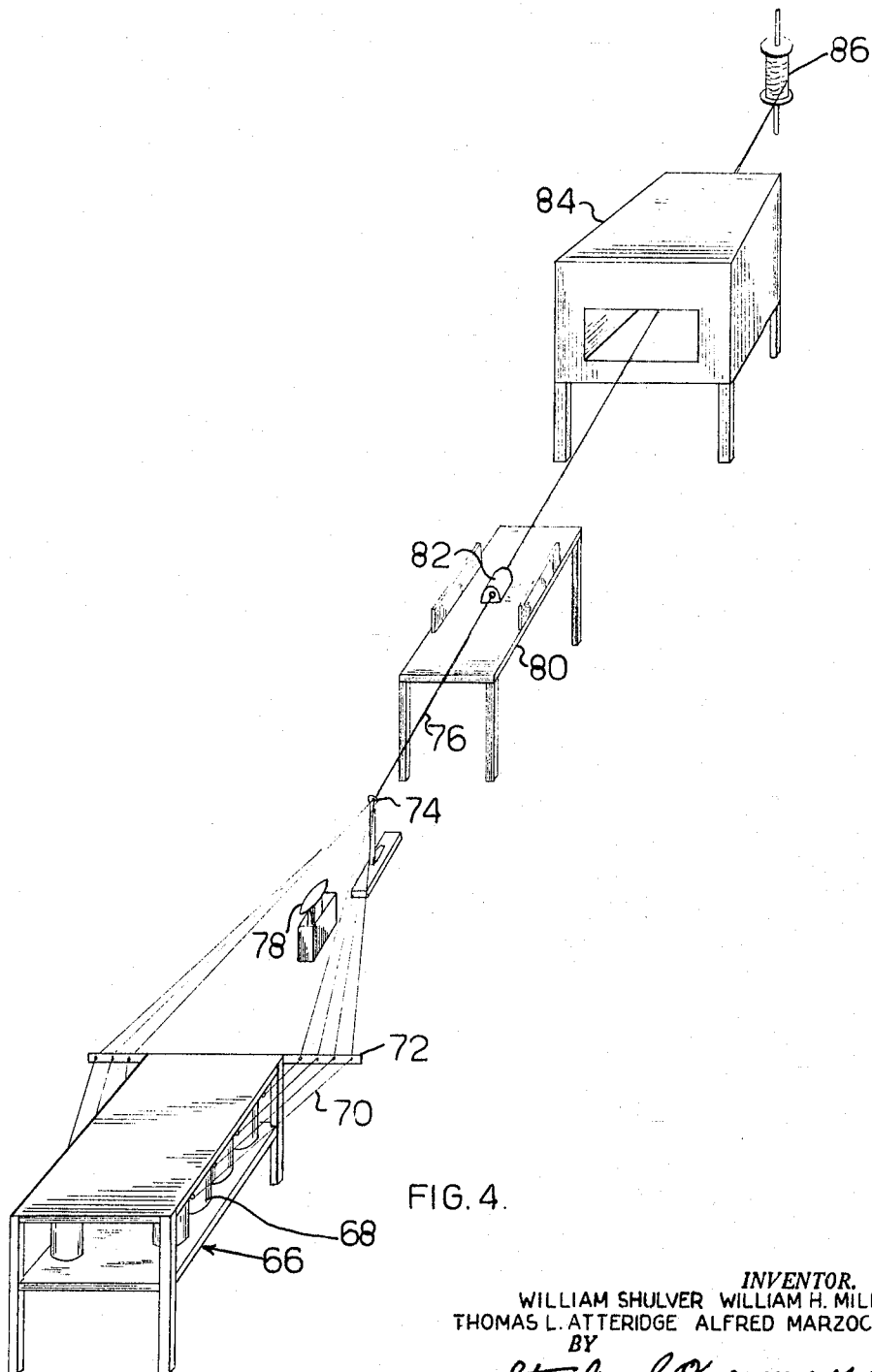

United States Patent Office 3,269,883
Patented August 30, 1966

3,269,883
METHOD FOR PRODUCING ELECTRICALLY-CONDUCTIVE ELEMENTS
William Shulver, Fairlawn Heights, Salesville, William H. Miller, Chepachet, Thomas L. Atteridge, Woonsocket, and Alfred Marzocchi, Cumberland, R.I., assignors to Owens-Corning Fiberglas Corporation, a corporation of Delaware
Filed Feb. 10, 1961, Ser. No. 88,542
16 Claims. (Cl. 156—166)

This invention relates to a method of applying an electrically-conductive coating to the outer surface of elongated glass fibers, and more particularly to a method for applying a semi-conducting coating to glass fiber filaments, the conductance of the coating being accurately predetermined in the manufacture process, the coating being uniform in its character and of substantially constant properties regardles of the conditions encountered during use.

It has been proposed in the past to provide elongated glass fibers having semi-conductive electrical properties. Such coated glass fibers have been proposed for use as resistors, suitable for example as grid leaks or in voltage divider networks. It has been suggested that such fibers may be woven into fabrics and utilized as sheathing for electrical cables used in high-voltage systems to result in a condenser action between the central conductor and the sheathing to avoid localized electrical discharge. Tape, braided or woven from the fibers, may also be used as shielding to reduce the emission of radio interference signals from communication cables and the like. Such shielding may also include copper wire as a carrier.

However, problems have arisen in the manufacture of suitable coated glass fibers. One problem has been to provide coated glass fibers having acceptable flexural strengths. Another problem has been to provide a conductive ribbon in which the fibers are arranged in parallel alignment as opposed to being woven or braided. Such parallel alignment is advantageous in some applications, such as in the communication field for helically wound cable tubing. A further desire has been to provide coated glass fibers which can be utilized as the current carrying core of an electrical line, such as communication and automobile ignition wire.

Additionally, it has been desired to provide a method for manufacture of such coated glass fibers which is efficient and inexpensive.

These problems are alleviated in the present invention in which it is an object to provide a method for manufacturing elongated glass fibers having an electrically-conductive coating thereon.

Another object of the invention is to provide a method for the uniform distribution of electrically-conductive particles on glass filaments.

A further object of the invention is to provide a method for manufacturing coated glass fibers of predetermined electrical conductivity.

Yet another object of the invention is to provide a process for producing coated glass fibers in which the semi-conductive electrical properties may be readily varied.

Another object of the invention is to provide a method for baking the electrically-conductive coating onto the glass fibers by utilizing a heated drum which is more efficient and occupies less space than the conventional oven.

A further object of th einvention is to employ such a heated drum to flatten a bundle of individual glass filaments during baking of the conductive film to result in a conductive ribbon in which the individual filaments are in planes substantially parallel to one another.

Another object is to provide an electrically-conductive flat tape by the above-mentioned process in which the individual filaments are parallel rather than woven or braided.

A still further object of the invention is to apply the initial conductive coating to the glass fiber filaments by means of a bath containing suspended electrically-conductive particles, and in which the electrically-conductive particles are continuously recirculated to reseult in a uniform coating on the glass fiber filaments.

A further object of the invention is to purovide a die for maintaining an even distribution of electrically-conductive particles on the glass fibers.

Another object of the invention is to provide means for coating glass filaments with graphite linters and a resin coating to result in a product having superior conductive properties.

A still further object of the invention is to provide a method of coating the electrically-conductive glass fibers with a plastic or similar film-forming material to result in improved abrasion resistance.

Other objects of this invention will appear in the following description and appended claims, reference being had to the accompanying drawings forming a part of this specification wherein like reference characters designate corresponding parts in the several views.

In the drawings:

FIGURE 1 is a top plan view of an apparatus utilized in one embodiment of the process of the present invention;

FIGURE 2 is a side elevational view in section of the coating bath taken substantially along the line 2—2 of FIGURE 1 looking in the direction of the arrows;

FIGURE 3 is a perspective view of the heated drum and idler roll utilized to dry and bake the coated glass fiber in the FIGURE 1 process; and FIGURE 4 is a perspective view of apparatus utilized in a second embodiment of the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to FIGURE 1, it may be seen that a creel 10 is provided to hold a plurality of rotatable rolls 12 of glass fiber strands. A strand is defined for the purpose of this invention as a primary bundle of continuous glass fiber filaments combined in a single compact unit without twist. Preferably, the filaments are pre-coated with a starch sizing as is conventional in the manufacture of glass filaments. The sizing aids in the handling of the filaments and the starch is caramelized during the present process to form part of the conductive-coating.

The creel 10 has two vertical stacks 19, 21 having three levels 20, 22, 24, each level holding ten rolls 12 to total sixty rolls. The strands 14 are directed from the creel through guide openings in guide structure 26 and thence to central eyes 28 wherein ten strands are gathered together to form rovings 30.

Each roving 30 passes over roller 32 which is rotatably mounted in support structure 34. The lower portion of the roller 32 dips into water contained in pan 36 and wets the roving passing thereover. Alcohol in amounts of from 2 to 5% may be added to the water to provide an improved pre-wetting mix. Other wetting agents may be added to the mix as desired.

The roving then passes through a pan 38 which contains, in liquid suspension, small particles of electrically-conducting material. The particles adhere to the roving as it passes therethrough the form a thin electrically-conducting film on the roving. Each individual filament of the roving will be so coated.

As will be noted in FIGURE 2, the pan 38 is supported on a table structure 40. The table 40 also supports a reservoir 42. Fluid is pumped from the bottom of reservoir 42 through conduit 44 by pump 46. Conduit 48 extends from the pump upwardly to a point above the pan 38. Spouts 50 having closure valves 52 direct streams of the fluid 54 into the pan and over the rovings. The pan 38 is canted slightly and the fluid 54 constantly runs out of the pan through the open front end 56 back into the reservoir 42. The purpose of continuously pumping from the reservoir into the pan and then allowing the fluid to flow back into the reservoir is to keep the fluid in a well-mixed condition to prevent settling of the electrically-conducting particles. In this way, a uniform coating on the roving is assured. The reservoir 42 is constantly replenished from an external source (not shown).

The coated roving each pass through openings 57 of predetermined size in dies 58 provided on the table 40. The dies wipe off the excess particles and fluid to maintain a uniform coating thickness. Additionally, the dies force the individual filaments together to achieve some degree of mechanical bond therebetween.

The coated rovings extend from the dies 58 over idler roller 60 and thence spirally over heated rotating drum 62. As will be understood, the roving slides sidewise in its spiral path over the drum. For this reason, it is important to adjust the pressure between the drum and roving to avoid binding of the roving with the drum surface. As shown in FIGURE 3, the roving takes approximately ten turns around the drum. The function of the heated drum is to dry the roving and bake the electrically-conducting particles onto the glass fiber. Additionally, the drum flattens the bundles of glass fibers and, during the baking process, bonds the individual fibers together in substantially parallel arrangement to form a flat ribbon.

As will be appreciated, the drum diameter and temperature and the number of times the roving passes thereover may be varied. It has been found, however, that with the roving traveling at 35 feet per minute drum temperatures in the range of from 550–650° F. are preferred. However, temperatures up to 700° F. may be employed.

The idler roller 60 is also preferably heated to a temperature approximating that of the drum 62. If the idler roller is cool or warm, it will pick up a portion of the coating material from the roving. This is, of course, undesirable because such a pickup will make the thickness of the final coating non-uniform.

After the roving leaves the drum 62, it is wound up on take-up rollers 64 and subsequently stored.

More than one coating of electrically-conductive particles may be applied. For example, one conductor material was made having three coatings of particles. This material was passed through a 32 foot oven at 600° F. at the rate of twenty-five feet per minute. Its conductivity was 4000 ohms per square inch.

A number of different electrically-conductive particles may be utilized to coat the glass fibers. For example, colloidal suspensions of graphite, carbon black and organo-metallo compositions which decompose under heat to form a metallic electrically conductive coating may be used. The percentage of electrically-conductive particles in the fluid mixture is varied depending on the desired thickness of the applied coating. Graphite is a preferred material because of its excellent electrical properties and because of its lubricating properties. When graphite coated filaments rub against each other, there is less friction and thus less abrasion. Additionally, elongated carbon particles, such as the graphite linters described hereinafter in conjunction with the second embodiment of the invention, may be included in the mixture of electrically-conductive particles. It has been found that when such elongated particles are used, less electrically-conductive material is necessary in the coating and the flexibility of the coating is improved. This may result from the greater interlinkage and dove-tailing between adjacent elongated elements as compared with the interlinkage of spherical particles.

One suitable commercially available material which has been used with success is sold under the trade name "Aquadag." This material is a concentrated colloidal dispersion of pure electric-furnace graphite in water. It is a paste consistency with a solids content of 22%. The average particle size is 0.5 micron and the maximum particle size is 4 microns. The specific gravity is 1.121 and the boiling point is 100° C. The material is completely miscible with water. This material is preferably diluted with water, for example, three parts water to one part Aquadag, to obtain a fluid which can be pumped and which will give the desired surface coating thickness.

In addition to the electrically-conductive particles, a binder material may be added to the suspension to improve the bond of the particles to the glass fibers. Preferably, the binder material, if used, is a carbonanceous material which will decompose to form carbon when heated. For example, sugar, starch, glucose, sorbitol, glycerol and the like may be used. When such materials are heated and thermally decomposed to carbon, they form an electrical bridge between the electrically-conductive particles to result in a continuous electrical path. Quaternary ammonium compounds have also been found useful for this purpose. It is preferable, however, to avoid or minimize the use of a binder material because the resultant electrical properties when a binder is used are not as good as when the binder is not used.

Alternative to the use of a heated drum, the roving may be passed through an oven to dry and bake the roving. As will be appreciated, when an oven is used the roving is not flattened.

The use of the drum-heating method, however, appears to be preferable to heating with an oven, particularly when starch sizing or binder is present in the filament coating. The advantages of drum-heating appear to derive from the fact that the drum heats the roving by conduction as opposed to heating by convection as in an oven. The high efficiency of the heat transfer directly from the drum surface to the filaments of the roving results in a faster and more thorough heating of the filaments. Roving which has been heated on a drum has superior flexibility over the same roving heated in an oven. The coating on oven heated roving is stiffer and tends to crack and break into particulate form more so than drum-heated roving. This results in a separation of the electrically-conductive particles with consequent reduced conductivity.

Apparently, when the roving is oven heated, the coating forms an outside casing on the fibers which inhibits heat transfer to the interior. The formation of the casing is likely due to the gradual nature of convection heating. Contrariwise, it is believed that the rapid and thorough drum-heating results in complete caramelizing of the filament sizing and other caramelizable materials in the coating. The caramelized material appears to have superior adhesivity and thus establishes a better bond between the electrically-conductive particles and the glass filaments.

Another possible explanation for the superiority of the drum-heated roving is that heating of the interior of the applied coating of filaments which have a starch sizing thereon may result in the adhesion of the hard carbon electrically-conductive particles directly to the glass. The theory is that caramelization of the sizing results in a contraction of the sizing coating. The hard carbon particles can thus move into direct contact with the surface of the glass filaments. Water constituents in the glass then combine with the carbon particles to provide better adhesion.

It has been further found that the electrical properties of the coated glass fibers may be improved if an electric current is passed through the fibers as the fibers are heated to carbonize and bake the coating thereon. The electric current tends to align the graphite and other carbon particles. Such alignment links up the particles and improves the conductivity of the coating.

It will be appreciated that the resultant product may be varied within wide limits. For example, the number of strands and the electrical resistance per foot of the product is capable of being varied as desired. One product produced consisted of 60 strands and had a resistance of 3000 ohms per foot. It has been found that strands having 100 or more filaments and roving having four or more strands are particularly useful.

Another embodiment of a method for applying an electrically-conductive film to glass fibers is illustrated in FIGURE 4. A creel 66 is provided having a plurality of rolls 68 to dispense strands 70 of glass fibers. The fibers extend through guide openings in guide structure 72 and pass to a central collecting eye 74 where they are formed into a roving 76. At a point just short of entering the gathering eye 74, the strands are sprayed with electrically-conductive linters by means of a flocking gun 78. The spray is directed towards the center of the converging strands. The linters are loosely held in the roving by entanglement with the strands.

Subsequent to passing through the eye 74, the roving 76 passes over table 80 and through applicator 82. Applicator 82 contains a resinous fluid coating material (supplied from an external source not shown) and a coating is applied to the roving. The resin acts as a binder and also is electrically-conductive.

Subsequent to the application of the fluid coating, the roving is directed into an oven 84 wherein the resin is cured thermally to form a tough coating. The thus coated roving is wound up on take-up roll 86.

The roving may be directed through a wiping die before or after baking in the oven depending upon the compatibilities of the materials. The die may be either of the rotating or stationary type.

The linters are preferably graphite of a size approximately ⅛ to 1 inch long. However, elongated metallic particles may also be utilized. If metallic particles are used, a reducing agent such as hydrazine, formaldehyde, (or hydride) or the like should be added to reduce the resistance between contacting particles. Graphite linters may be manufactured by graphitizing natural or synthetic fibers.

The fluid coating for the roving may be an organosal, plastisol or latex resin, such as vinyl or butyl acrylate which is partially hydrolysed or it may be a coating composition such as a lacquer. In order to obtain maximum conductivity when using an emulsified resin, it is preferable that the diluents or plasticizers be reduced to a minimum concentration. Additionally, an improved material will result if the conductive particles are adsorbed on the surface prior to application of the resin or coating composition.

The resultant conductive glass fibers will have improved conductivity over that provided by other forms of electrically-conductive materials because of the linear structure of the linters. It has been found that very small amounts of such linear material results in superior conductivity.

In use of the coated linter conductor, current passes through the outer low conductive coating to the core which contains the linters and thence along the core to an exit point such as ground where it again passes through the outer cover.

We claim:

1. A method of applying an electrically-conductive coating to a bundle of substantially aligned glass fibers comprising coating the outer surface of the elongated bundle of glass fibers with particles of carbonaceous electrically-conductive material; and then heating the bundle of coated fibers to cause the particles to adhere to the fibers and to interconnect the fibers one to another.

2. The process of manufacturing an electrical conductor comprising the steps of passing a bundle of substantially aligned glass fibers through a liquid mixture containing carbonaceous electrically-conductive particles therein whereby the bundle of glass fibers is coated with said particles; and then heating the bundle of coated fibers to adhere the conductive particles to the fibers and to connect the fibers one to another.

3. The method of manufacturing an electrical conductor comprising the steps of passing a bundle of substantially aligned glass fibers through a colloidal dispersion of graphite particles in water to coat the outer surface of the bundle of glass fibers with graphite particles; and then heating the bundle of coated fibers to cause the particles of graphite to adhere to the fibers and to interconnect the fibers one to another.

4. The process of manufacturing an electrical conductor comprising the steps of passing a bundle of substantially aligned glass fibers through a liquid mixture containing carbonaceous electrically-conductive particles therein whereby the glass fibers are coated with said particles; then passing the coated bundles through an opening of predetermined size to wipe off excess particles and establish a coating of uniform thickness; and then heating the coated bundle of fibers to adhere the conductive particles to the fibers and to adhere the fibers one to another.

5. The method of applying an electrically-conductive coating to a bundle of substantially aligned glass fibers comprising the steps of passing the bundle of glass fibers through a vessel containing a liquid mixture of carbonaceous electrically-conductive particles whereby the glass fibers are coated with said particles; continuously draining the liquid from said vessel into a reservoir; pumping liquid from the bottom of said reservoir back into the vessel and over the fibers to continuously replenish the liquid material in the vessel to thus prevent settling of the electrically-conductive particles; and then heating the bundle of coated fibers to cause the particles to adhere to the fibers.

6. The process of applying an electrically-conductive coating to a bundle of substantially aligned glass fibers comprising first wetting the fibers with water; then passing the fibers through a liquid mixture containing carbonaceous electrically-conductive particles therein whereby the glass fibers are coated with said particles; and then heating the bundle of the coated fibers to adhere the conductive particles to the fibers.

7. The method as claimed in claim 6 and further characterized in that the bundle of glass fibers is initially wetted with a mixture comprising from 2 to 5% alcohol with the remainder being water.

8. The process of manufacturing an electrical conductor comprising the steps of passing a bundle of substantially aligned glass fibers through water to wet the fibers; then passing the bundle through a vessel containing a liquid mixture of carbonaceous electrically-conductive particles therein whereby the glass fibers are coated with said particles; continuously draining the liquid in said vessel into a reservoir; continuously recirculating the liquid from the bottom of the reservoir back into the vessel and over the bundle of glass fibers to maintain the liquid material in a well-mixed condition; then passing the bundle of glass fibers through a die opening of predetermined size to wipe off a portion of the adherent particles to thereby control the thickness of the film on the bundle; and then heating the thus coated bundle of glass fibers to dry the fibers, adhere the conductive particles to the fibers, and adhere the fibers one to the other.

9. The process of making an electrical conductor comprising the steps of passing a bundle of elongated glass filaments through a liquid mixture containing carbonaceous electrically-conductive particles therein to apply a coating of the electrically-conductive material thereon; and then placing the coated bundle of filaments in pressure contact with a heated drum to flatten the bundle of filaments into substantially parallel alignment and bond the conductive particles to the filaments and the filaments to one another.

10. A method of manufacturing an electrically-conductive flat tape comprising the steps of passing a bundle of glass filaments through a liquid mixture containing carbonaceous electrically-conductive particles therein to apply a coating of the electrically-conductive material to each filament; then directing the coated bundle over a heated idler roller in contact therewith; and then placing the coated bundle of filaments in pressure contact with a heated drum to flatten the bundle of filaments into substantially parallel alignment and bond the conductive particles to the filaments and the filaments to one another.

11. The method of claim 10 and further characterized in that the drum is maintained at a temperature of from 700 to 850° F.

12. The process of making an electrical conductor comprising the steps of passing a bundle of glass filaments through a liquid mixture containing carbonaceous electrically-conductive particles therein to apply a coating of the electrically-conductive material to the glass filaments; and then spirally winding the coated bundle of filaments around a rotating heated drum; said coated bundle being in pressure contact with the drum to cause flattening of the bundle of filaments into substantially parallel alignment with each other; and maintaining contact with the heated drum for a time sufficient to bond the conductive particles to the filaments and the filaments to one another.

13. The process of manufacturing an electrical conductor comprising the steps of directing a plurality of bundles of substantially aligned glass fibers to a point of convergence; directing a spray of carbonaceous electrically-conductive linters onto the bundles at the center of the convergence immediately prior to the convergence; then applying a fluid film forming coating composition to the converged bundles; and then heating the thus coated bundles to cure the coating composition.

14. A method of producing an electrical conductor comprising the steps of rotatably mounting a plurality of rolls of glass fiber strands in spaced apart relationship; directing the strands from the rolls to a central eye to form a roving of substantially aligned glass fiber strands; entwining graphite linters within the roving during the formation of the roving; then coating the roving with a resinous material; and then curing the resinous material and compressing the roving to combine the linter filled strands into a unitary structure with a tough coating therearound.

15. The process of making an electrical conductor comprising the steps of passing a bundle of glass filaments having a starch sizing coating thereon through a liquid mixture containing carbonaceous electrically-conductive particles therein to apply a coating of the electrically-conductive material to the glass filaments; and then spirally winding the coated bundle of filaments around a rotating heated drum; said coated bundle being in pressure contact with the drum to cause flattening of the bundle of filaments into substantially parallel alignment with each other; and maintaining contact with the heated drum for a time sufficient to caramelize the starch sizing, bond the electrically-conductive particles to the filaments and the filaments to one another.

16. The method of manufacturing an electrical conductor comprising the steps of passing a bundle of substantially aligned glass fibers through a colloidal dispersion of both elongated and substantially spherical graphite particles in water to coat the outer surface of the glass fibers with graphite particles; and then heating the coated fibers to cause the particles of graphite to adhere to the fibers and to interconnect the fibers one to another.

References Cited by the Examiner
UNITED STATES PATENTS

| | | | |
|---|---|---|---|
| 1,832,419 | 11/1931 | Pender | 117—226 XR |
| 2,699,415 | 1/1955 | Nachtman | 156—180 |
| 2,703,356 | 3/1955 | Buchanan | 117—226 XR |
| 2,778,763 | 1/1957 | Novak | 161—192 |
| 2,867,552 | 1/1959 | Homer | 117—217 |
| 2,938,821 | 5/1960 | Nack | 156—47 |
| 2,985,803 | 5/1961 | Brennan | 156—48 |
| 3,002,862 | 10/1961 | Smith-Johannsen | 117—226 |
| 3,081,202 | 3/1963 | Kemp | 117—216 |

EARL M. BERGERT, *Primary Examiner.*

CARL F. KRAFFT, *Examiner.*

M. Q. TATLOW, R. J. CARLSON, R. H. CRISS,
*Assistant Examiners.*